Dec. 29, 1936.  A. E. McCOY  2,065,598
TRACTOR
Filed April 10, 1936  3 Sheets-Sheet 1

Inventor
Aaron E. McCoy
By Faust F. Crampton.
Attorney

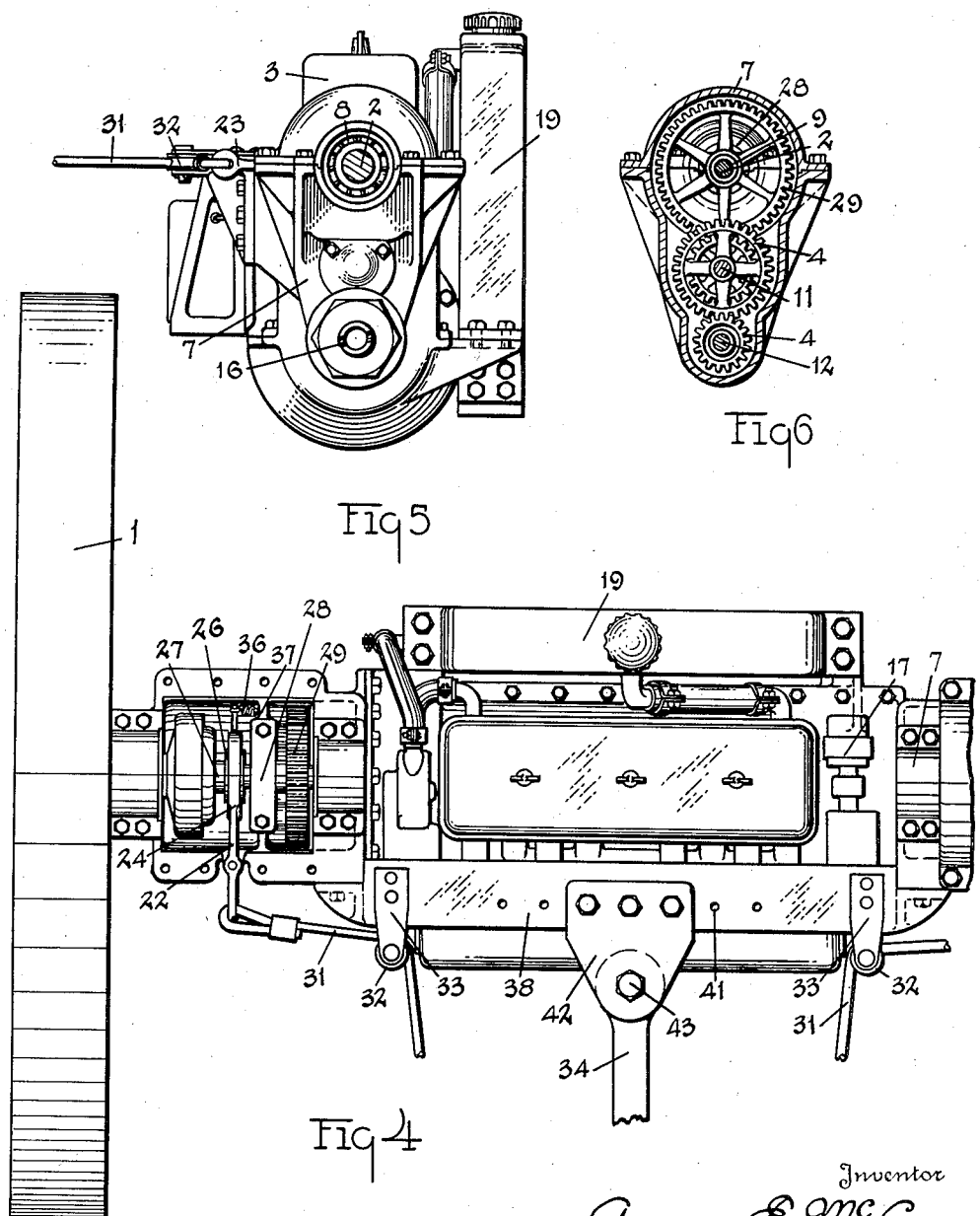

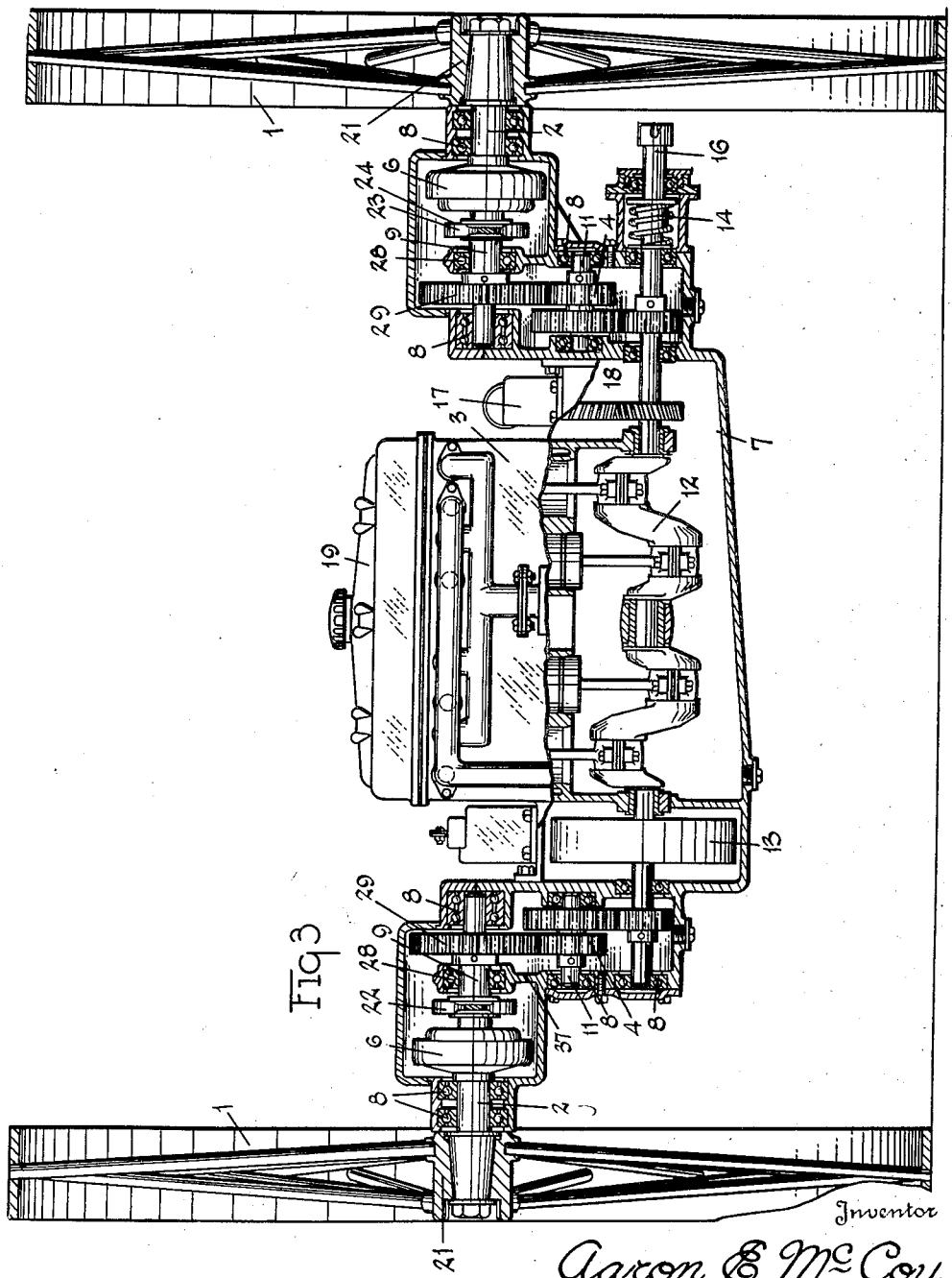

Patented Dec. 29, 1936

2,065,598

UNITED STATES PATENT OFFICE 2,065,598

TRACTOR

Aaron E. McCoy, Malin, Oreg.

Application April 10, 1936, Serial No. 73,659

1 Claim. (Cl. 180—17)

My invention has for its object to provide a two-wheel tractor wherein the engine is suspended between the wheels of the tractor, and clutches for connecting one or both of the wheels to the engine according to the clutch pressures to direct the movement of the tractor.

The tractor may be connected to a trailer, such as an agricultural implement or a vehicle, by a tongue of sufficient length and strength to prevent rotation of the engine body, notwithstanding the resistance to forward movement produced by the load or the irregularities of the surface over which the tractor wheels move. The clutches may be controlled by flexible lines or straps to direct the tractor. The invention thus provides an exceedingly convenient hauling or drawing implement for agricultural purposes.

The invention may be contained in tractors that vary in the details of their constructions. To illustrate a practical application of the invention, I have selected a particular tractor as illustrative of the tractors that embody the invention and shall describe the particular tractor hereinafter. The tractor selected as an example of the invention is shown in the accompanying drawings.

Figure 1:
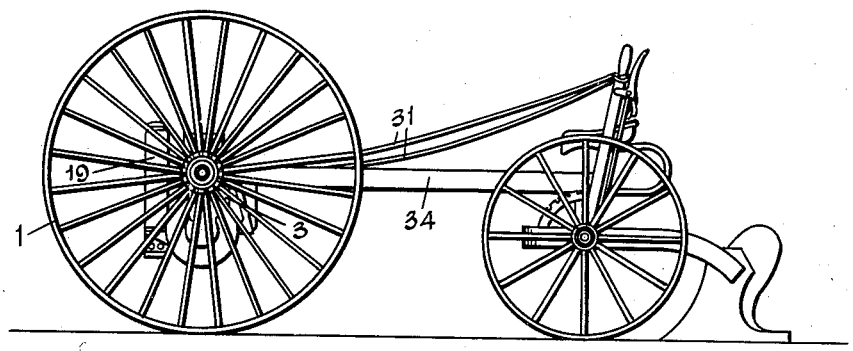
Figure 2:
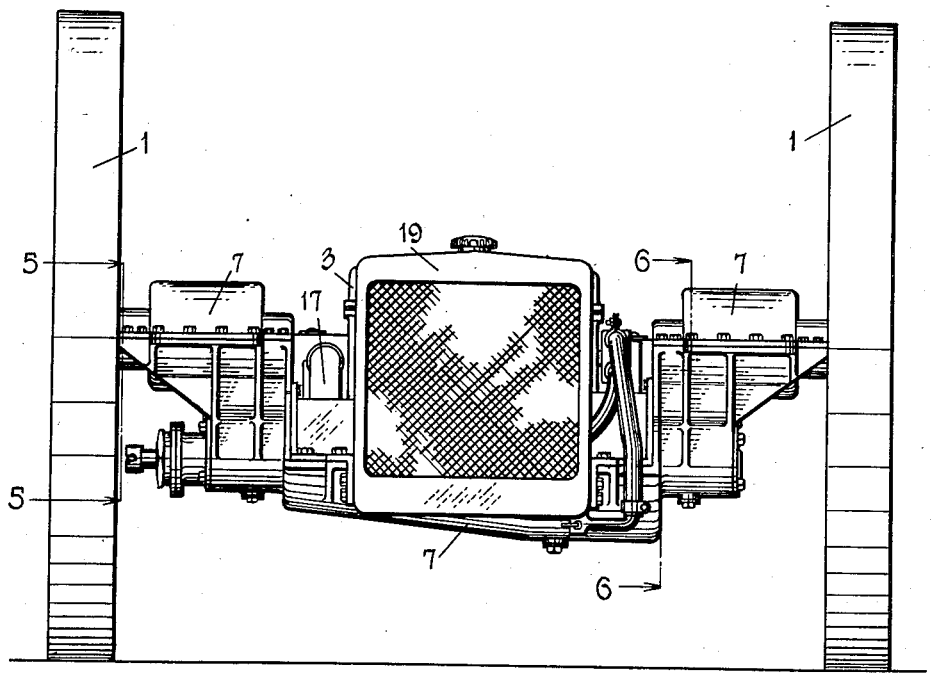

Fig. 1 of the drawings illustrates a side view of the tractor connected to a sulky plow. Fig. 2 illustrates a front view of the tractor. Fig. 3 illustrates a vertical section of the tractor. Fig. 4 illustrates an end part of the tractor. Fig. 5 is a view of a section taken on the plane of the line 5—5 indicated in Fig. 2. Fig. 6 is a view of a section taken on the broken line 6—6 indicated in Fig. 2.

The tractor illustrated in the drawings is provided with a pair of bull-wheels 1 having a pair of jack shafts 2 on which the engine 3 is supported and to which the engine is connected by speed reducing gear wheels 4 and suitable friction disk clutches 6.

The engine, the gear wheels, and the clutch mechanism are supported in a suitable shell 7 which is provided with bearings 8 for rotatably supporting a crank shaft 12, the shafts 11 that rotatively support certain of the reducing gears, the jack shafts 2, and the drive shafts 9. The crank shaft is provided with a suitable fly wheel 13 for the purpose of producing a momentum in the crank shaft, particularly when idling, to maintain the cyclic operation of the engine, in the manner well known in the art.

The engine is also provided with a suitable spring-pressed starting clutch 14 and the usual recessed crank connecting shaft 16 to which a starting crank may be connected through the spokes of one of the bull-wheels 1. Also, a suitable ignition and timer mechanism 17 may be connected through the gear wheels 18 to the crank shaft 12. The engine is provided with the usual radiator 19.

The jack shafts 2 are connected to the hubs 21 of the bull-wheels 1. Thus, the operation of the crank shaft 12 by the engine will be transmitted through the gear wheels 4 to the drive shafts 9 and to the bull-wheels 1 when the clutch mechanisms are operated.

A pair of levers 22 and 23 are pivotally supported in the shell 7. The ends of the levers are provided with suitable rings 24 having projecting parts for engaging in peripheral slots formed in the disks 26. The disks 26 are connected to sleeves 27 which are slip-keyed to the drive shafts 9 to clamp and release the friction disks of the clutch 6 to frictionally connect the drive shafts 9 with the jack shaft 2, in the manner well known in the art. The gear wheels 29 are connected to the drive shafts 9. The drive shafts 9 may be formed tubular and sleeved on to the jack shafts 2. The shafts 2 and 9 may be supported in the bearing 28.

The levers 22 and 23 extend through the wall of the shell 7, and the outer ends of the levers are connected to straps or flexible lines 31. The straps or lines 31 pass over grooved pulley wheels 32 supported in brackets 33 secured to the wall of the shell 7. The straps or lines 31 extend to the rear of the tractor and to the trailer or other agricultural implement that may be connected by means of the tongue 34 to the tractor. The levers 22 and 23 may be spring pressed by springs located within the clutches 6 or by the springs 36 located intermediate the inner ends of the levers 22 and a partitioning wall 37 in which is located one of the bearings 8. The springs 36 are tension springs and yieldingly resist the operation of the levers 22 and 23 by the lines 31. The springs bias the clutches to their release positions. Consequently, the lines may be drawn to produce desired pressures of the disks and the desired slippage as between the disks, and, consequently, the desired relative rotation of one bull-wheel to the other may be produced. When, therefore, one of the lines is released relative to the other line or one line is drawn with a slightly greater pull than the other, one of the bull-wheels will advance over that of the other bull-wheel and cause the corresponding curved or turning movement of the tractor. When there is substantially the same pull on the lines 31, the tractor will move in a straight line. The trailer, of course, will follow.

The tongue 34 may be connected to a flange 38 provided with a plurality of bolt holes 41 for securely connecting suitable steel plates 42 between which the tongue 34 may be pivotally mounted and connected by means of a relatively large pivot pin 43.

I claim:

In a tractor, a U-shaped shell, the upper ends of the leg of the U-shaped shell having bearings enclosed in the upper ends of leg parts of U-shaped shell, a pair of wheels, jack-shafts connected to the wheels and located in the bearings for pivotally and pendulously supporting the body of the shell below the axis of the jack-shafts, an engine crank shaft enclosed in the transverse part of the U-shaped shell, an engine supported on the said transverse part of the shell for operating the crank shaft, bearings located in legs of the U-shaped shell, a train of gear wheels for connecting each end of the crank shaft with a drive shaft and enclosed in the legs of the U-shaped shell and supported in said last named bearings, and an independently operative clutch for connecting each drive shaft with a jack-shaft, the length of the legs of the U-shaped shell being such as to locate the center of gravity of the shell and the parts supported thereon well below the axis of the wheels.

AARON E. McCOY.